UNITED STATES PATENT OFFICE.

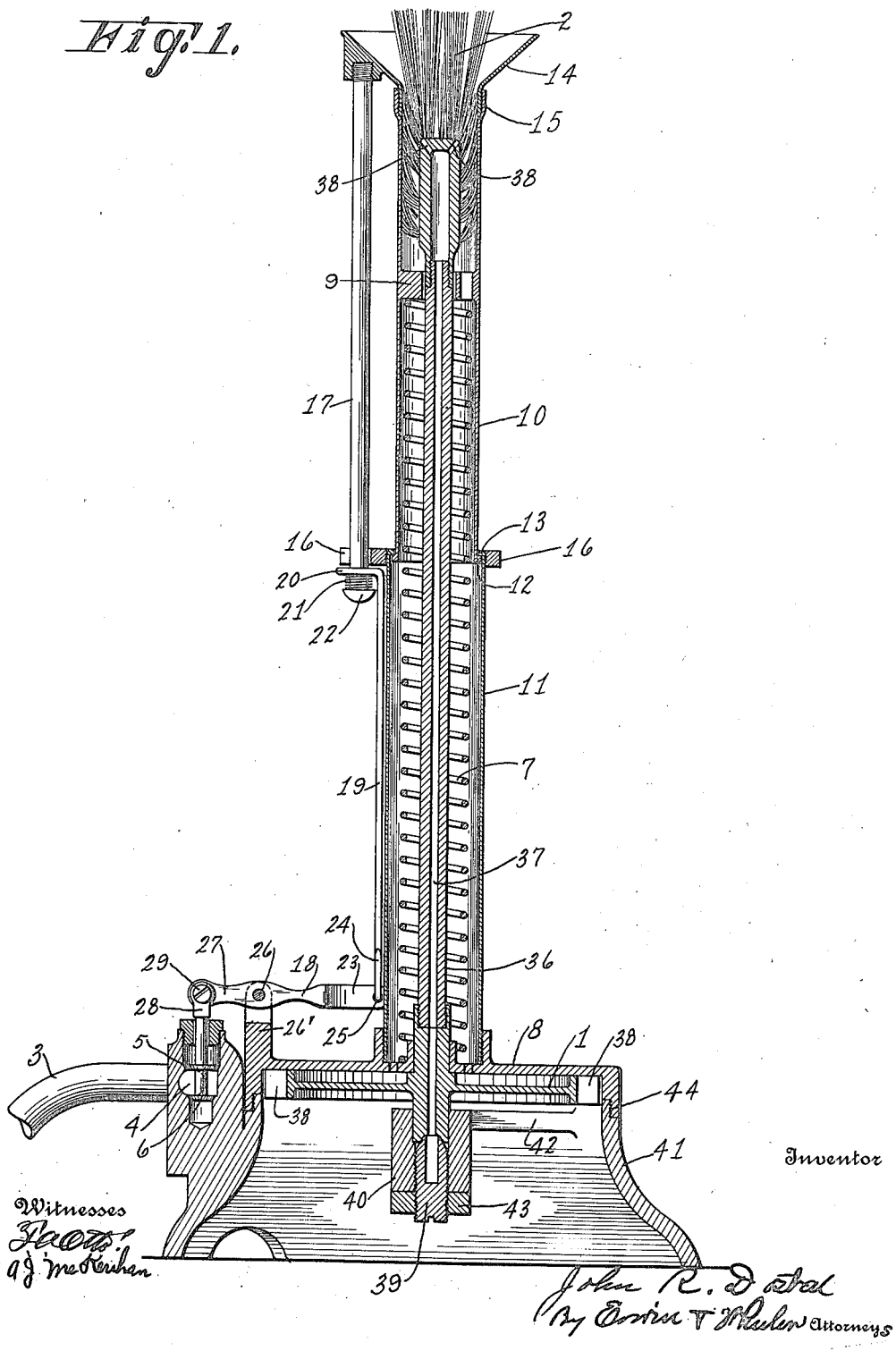

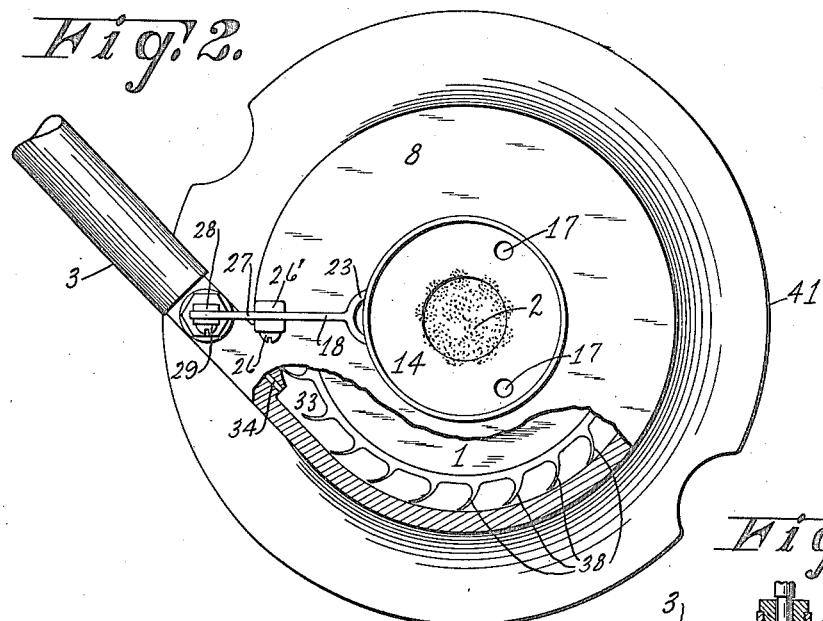
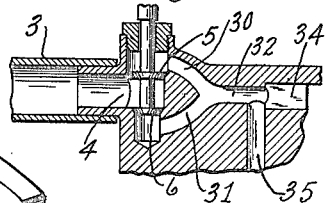
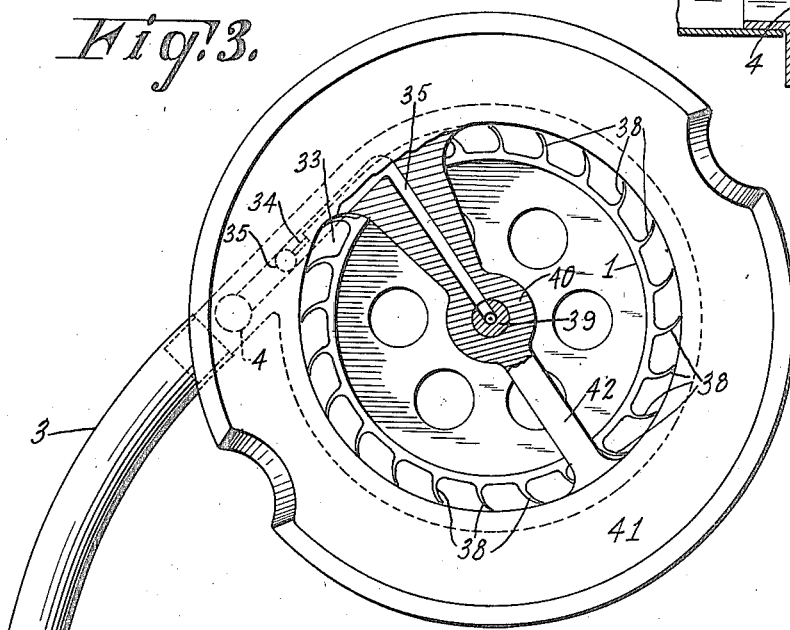

JOHN R. DOSTAL, OF MILWAUKEE, WISCONSIN.

BOTTLE-WASHER.

1,227,594.

Specification of Letters Patent.

Patented May 29, 1917.

Application filed October 4, 1915. Serial No. 53,889.

*To all whom it may concern:*

Be it known that I, JOHN R. DOSTAL, a citizen of the United States, residing at the city of Milwaukee, county of Milwaukee, and State of Wisconsin, have invented new and useful Improvements in Bottle-Washers, of which the following is a specification.

My invention relates to improvements in machines for washing bottles, drinking glasses and other similar receptacles, and it pertains, more especially, among other things to the construction of the mechanism for revolving a brush in contact with the surface of the receptacle to be cleansed and simultaneously discharging water upon the surface of the receptacle which is being washed.

My invention is further explained by reference to the accompanying drawings, in which—

Figure 1 represents a vertical section thereof.

Fig. 2 is a top view, part broken away.

Fig. 3 is a bottom view, also part broken away.

Fig. 4 is a vertical section of the valve mechanism by which the course of water is controlled, a side view being shown of the valves therein.

Like parts are identified by the same reference numerals throughout the several views.

The water is led to the water wheel 1 and brush 2 through the duct 3, when it passes into the valve chamber 4 between the balanced valves 5 and 6. When the machine is at rest water is prevented from entering the duct leading to the water wheel and brush by said valves 5 and 6, and said valves are held in their closed position by the recoil of the spiral spring 7. Said spring 7 is interposed between the base plate 8 and the collar 9, and the tension of such spring is such as to raise the telescoping tube 10 from within the telescoping tube 11 until the collar 12 is brought in contact with the collar 13, whereby said tube 10 is caused to remain at rest. 14 is a funnel shaped member for the reception of the bottle or other receptacle to be washed. The member 14 is rigidly connected with the telescoping tube 10 by a threaded or welded joint 15 and said member 14 is connected with the upper end of the tube 11 by the collar 16 and one of the several vertical rods 17, two of which are shown in Fig. 2. One of the rods 17 is connected with the two armed lever 18 by the link 19. The link 19 is provided at its upper end with a loop 20 which engages the lower end of said rod 17, and I preferably interpose a short spiral spring 21 between said loop and the knob 22 which knob 22 is rigidly connected with the lower end of said rod 17. The lower end of said link 19 is connected with the arm 23 of said two armed lever by the hooked member 24, and said member 24 passes loosely through the aperture 25 formed in one end of said lever. Said lever 18 is centrally connected with the base 8 by a pivotal bolt 26 and standard 26', and the opposite end 27 of said lever is pivotally connected with the balanced valves 5 and 6 by the valve rod 28. The valve rod 28 is connected with said lever 18 by the pivotal bolt 29.

It will now be understood that when washing a bottle or other receptacle the same is placed with its mouth downward and around the upper end of the brush 2 when by a downward pressure against the member 14 said spring 7 will be compressed and the telescoping tube 10 will slide within the telescoping tube 11. As said spiral spring 7 is compressed and the telescoping tube 10 is forced downwardly within the tube 11 the rod 17, shown in Fig. 1 is also moved downwardly with the telescoping tube 10, whereby the upward pull produced by the spiral spring 21 upon the link 19 will be released, when the arm 23 will drop. As soon as the arm 23 is released from such upward pull the balanced valves 5 and 6 will be raised by the excessive pressure of the water against the larger valve 5 within the chamber 4.

It will be understood that owing to the fact that the upper balanced valve 5 is larger than the lower balanced valve 6 both of said valves together with their connecting stem will be simultaneously raised as stated by the action of the water, when the water will pass through the branch ducts 30 and 31 to the single duct 32, when part of the water will pass direct to the chamber 33 through the duct 32 and duct 34, while a portion of the water will pass down through the duct 35 and thence to the center of the wheel supporting shaft 36 through the duct 37 when it passes up through said duct 37 and escapes therefrom through one or more ducts 38, whereby it will be brought in contact with the inner surface of the bottle or other receptacle to be washed, while the brush 2 will be simultaneously rapidly revolved by the action of said water wheel 1 as the stream is brought successively in contact with the buckets 38. It will, of course, be understood that as soon as the bottle or other receptacle is removed from the member 14 said member 14 together with the telescoping tube 10 will be again raised to the position shown in Fig. 1 by the recoil of the spiral spring 7, whereby motion will be communicated through the mechanism previously described to said balanced valves 5 and 6, whereby the water will be cut off when the wheel 1 together with the brush will cease to revolve. The wheel 1 and shaft 36 are revolubly supported in the position shown in Fig. 1 by the nut 39, and said nut 39 has threaded bearings in the sleeve 40, said sleeve being supported from the base collar 41 by a plurality of radial arms 42. 43 is a lock nut by which the supporting nut 39 is retained in place in the sleeve 40. The member 41 is retained in connection with the base member 8 by a threaded joint 44 or in any convenient manner.

Having thus described my invention what I claim as new and desire to secure by Letters Patent, is:—

1. In a device of the described class, the combination of a water wheel, a hollow shaft connected at one end to said wheel and at its opposite end to a brush, a brush, a water duct communicating from a water supply under pressure with said wheel, and a separate duct communicating with said hollow shaft, a plurality of telescoping tubes inclosing said hollow shaft, means for simultaneously leading water to both said wheel and hollow shaft, a wheel inclosing case, a funnel shaped member affixed to the upper member of said telescoping tubing, a pair of valves of unequal area connected with said funnel shaped member for controlling the passage of water through said valves to said wheel and hollow shaft, and means coöperating with said valves connected with said funnel shaped member for permitting said valves to close.

2. In a device of the described class, the combination of a water wheel, a brush, a hollow shaft connected at one end to said wheel and at its opposite end to said brush, a water duct communicating from a water supply under pressure both with said wheel and said hollow shaft, a wheel inclosing case, the lower member of said telescoping tubing being supported from said wheel inclosing casing, a funnel shaped member affixed to the upper member of said tubing, a pair of balanced valves of unequal area coöperating with said funnel shaped member for controlling the passage of water to said wheel and hollow shaft, such valves being opened as soon as downward pressure is applied to the upper of said telescoping tubes, and means connected with the upper member of said telescoping tubes for permitting the opening and closing of said water controlling valves.

3. In a device of the described class, the combination of a water wheel, a hollow shaft connected at one end with said wheel and at its opposite end with a brush, a brush, a water duct communicating from a water supply under pressure both with said wheel and hollow shaft, a wheel inclosing casing, the lower end of said hollow shaft being supported from said wheel inclosing casing, telescoping tubing a funnel shaped member affixed to the upper member of said telescoping tubing, water controlling valves for controlling the passage of water both to said wheel and hollow shaft, means connected with the upper end of said tubing for permitting the opening and closing of said water controlling valves, a spiral spring inclosed between the members of said tubing and adapted by its recoil to automatically extend said tubing and close said water controlling valves as soon as pressure is removed from said funnel shaped member.

In testimony whereof I affix my signature in the presence of two witnesses.

JOHN R. DOSTAL.

Witnesses:
  Jas. B. Envin,
  Harry Worrhill.